(12) United States Patent
Robbins

(10) Patent No.: US 11,912,247 B2
(45) Date of Patent: Feb. 27, 2024

(54) TRACKOUT MAT

(71) Applicant: RubberForm Recycled Products, LLC, Lockport, NY (US)

(72) Inventor: William J. Robbins, Lockport, NY (US)

(73) Assignee: RUBBERFORM RECYCLED PRODUCTS, LLC, Lockport, NY (US)

( * ) Notice: Subject to any disclaimer, the term of this patent is extended or adjusted under 35 U.S.C. 154(b) by 600 days.

(21) Appl. No.: 17/066,691

(22) Filed: Oct. 9, 2020

(65) Prior Publication Data
US 2021/0107437 A1    Apr. 15, 2021

Related U.S. Application Data

(60) Provisional application No. 62/913,570, filed on Oct. 10, 2019.

(51) Int. Cl.
*E01C 9/08* (2006.01)
*B60S 3/04* (2006.01)

(52) U.S. Cl.
CPC ............. *B60S 3/042* (2013.01); *E01C 9/086* (2013.01)

(58) Field of Classification Search
CPC ............. E01C 9/08; E01C 9/083; E01C 9/086
See application file for complete search history.

(56) References Cited

U.S. PATENT DOCUMENTS

| | | | | |
|---|---|---|---|---|
| 2,895,389 A | * | 7/1959 | Nagin | E01C 9/10 52/180 |
| 3,096,939 A | * | 7/1963 | Kalfen | B60B 39/12 238/14 |
| 4,488,833 A | * | 12/1984 | Perry | E01D 15/22 14/27 |
| 4,650,115 A | * | 3/1987 | Fontaine | B60B 39/12 238/14 |
| 5,275,502 A | * | 1/1994 | Glaza | E01C 9/083 404/35 |

(Continued)

FOREIGN PATENT DOCUMENTS

DE    2619503 A1 * 11/1977
DE    2636983 A1 *  2/1978

(Continued)

*Primary Examiner* — Thomas B Will
*Assistant Examiner* — Katherine J Chu
(74) *Attorney, Agent, or Firm* — HAUPTMAN HAM, LLP

(57) ABSTRACT

A block includes a first block portion, a second block portion, a third block portion and a fourth block portion. The first block portion has a first upper surface, a second upper surface, and a lower surface. The second block portion is over the first block portion and has a third upper surface. The third block portion is over the first block portion and has a fourth upper surface. The fourth block portion is over the first block portion, has a fifth upper surface, and is positioned between the second block portion and the third block portion. A first recessed region is between the second block portion and the fourth block portion. A second recessed region is between the third block portion and the fourth block portion. The first upper surface is exposed in the first recessed region and the second upper surface is exposed in the second recessed region.

20 Claims, 9 Drawing Sheets

(56) References Cited

U.S. PATENT DOCUMENTS

| | | | |
|---|---|---|---|
| 5,383,742 A * | 1/1995 | Grace | E01C 9/083 |
| | | | 238/14 |
| 6,468,622 B1 | 10/2002 | Combs et al. | |
| 6,981,818 B1 | 1/2006 | Lange | |
| 7,059,799 B1 | 6/2006 | Lange | |
| 7,731,448 B2 * | 6/2010 | Fillie | E01F 9/529 |
| | | | 404/15 |
| 8,061,927 B1 | 11/2011 | Martinez | |
| 8,210,443 B2 * | 7/2012 | Studstill | B60B 39/00 |
| | | | 238/14 |
| 9,776,599 B2 * | 10/2017 | Watkins | E01C 9/086 |
| 2013/0259568 A1 * | 10/2013 | Bouchard | B26D 3/005 |
| | | | 404/35 |
| 2015/0265491 A1 * | 9/2015 | Henshue | E01C 5/001 |
| | | | 404/19 |
| 2020/0157747 A1 * | 5/2020 | Penland, Jr. | E01C 5/20 |

FOREIGN PATENT DOCUMENTS

| | | | | |
|---|---|---|---|---|
| DE | 3219735 A1 * | 1/1983 | | |
| EP | 0159865 A2 * | 10/1985 | | |
| FR | 2846980 A1 * | 5/2004 | | E01C 9/086 |
| GB | 1025854 A * | 1/1964 | | |
| GB | 2272237 A * | 5/1994 | | B60B 39/12 |
| GB | 2569385 A * | 6/2019 | | E01C 5/226 |
| GB | 2590966 A * | 7/2021 | | E01C 11/265 |
| WO | WO-2019229474 A1 * | 12/2019 | | |

\* cited by examiner

TRACKOUT MAT

PRIORITY

The present application claims priority to U.S. Provisional Patent Application No. 62/913,570, filed Oct. 10, 2019, which is incorporated by reference herein in its entirety.

BACKGROUND

Construction sites often have ingress and egress locations over which vehicles travelling to and from may pass. Debris that exists at a construction site sometimes adheres to vehicles. For example, vehicles leaving construction sites often carry dirt, gravel, and other debris from the construction site out onto adjacent streets, roads, and highways. Trackout mats are used at the ingress and egress locations to attempt to remove at least some of the debris from the vehicle as the vehicle travels over the trackout mat.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
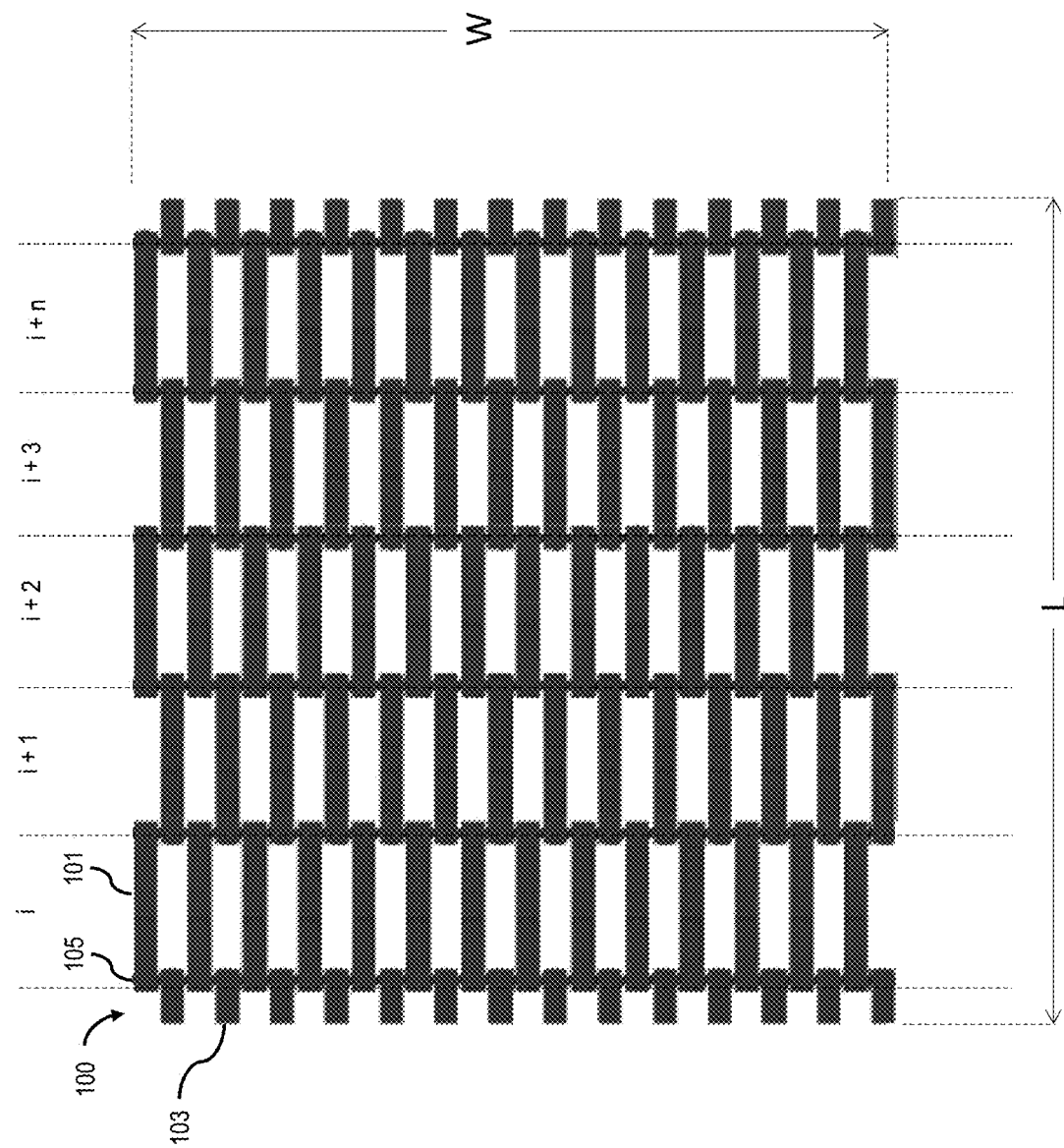
FIG. 1 is an overhead view of a trackout mat, in accordance with one or more embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Trackout mats are often used at ingress and egress points at a construction site to attempt to remove debris from a vehicle as the vehicle travels over the trackout mat. For example, vehicles leaving construction sites often carry dirt, gravel, and other debris from the construction site out onto adjacent streets, roads, and highways, which can be a safety hazard. But, the trackout mats are used at the ingress and egress locations to rattle or shake a vehicle so that the debris which could be transported out onto a roadway, street or highway, is shaken or knocked off. To be usable for rattling or shaking a vehicle to loosen or remove debris from the vehicle, or to directly knock debris off of vehicle tires, for example, conventional trackout mats are often heavy, rigid objects that are difficult to handle, transport, and store. Trackout mats also suffer heavy abuse from traffic, construction vehicles and the environment. As a result, conventional trackout mats are often damaged or wear out, and have to be replaced in their entirety.

The present disclosure provides example embodiments that make it possible to improve trackout mat maneuverability, transportation, handling, storage capabilities, longevity, repair capability, and performance.

FIG. 1 is an overhead view of a trackout mat 100, in accordance with one or more embodiments. Trackout mat 100 comprises a plurality of main blocks 101, a plurality of ramp blocks 103, and a plurality of couplings 105. Trackout mat 100 has a length L and a width W.

Main blocks 101 are arranged in columns and rows. For example, main blocks 101 are arranged in columns i to i+n, and any quantity of rows. Couplings 105 extend in a column direction through main blocks 101 such that the main blocks 101 in a column are coupled with one another and with main blocks 101 that are in an adjacent column, forming a mesh of main blocks 101.

Ramp blocks 103 are removably attached to one or more of the main blocks 101 by way of one or more couplings 105. Each ramp block 103 comprises a ramp portion and a connection portion, wherein each ramp block 103 is between at least two main blocks 101. In some embodiments, trackout mat 100 is free from having ramp blocks 103. In some embodiments, trackout mat 100 has a different quantity of ramp blocks 103 between main blocks 101. In some embodiments, a quantity of ramp blocks 103 arranged in a single column is equal to a quantity of rows of main blocks 101. In some embodiments, the quantity of rows of main blocks 101 is greater than the quantity of ramp blocks 103 arranged in a single column. In some embodiments, ramp blocks 103 are arranged on sides of the trackout mat 100 that serve as entrance and exit ramps. The ramp blocks 103 are sloped to provide transition depths for vehicles that drive over the trackout mat 100 and assist in propping a vehicle up onto main blocks 101 as the vehicle travels over trackout mat 100. In some embodiments, one or more ramp blocks 103 is replaced by an end block that is free from having a ramp portion, serving as a spacer between at least two main blocks 101 in a same column.

In some embodiments, main blocks 101 comprise an injection molded rubber material. In some embodiments, main blocks 101 comprise a compression molded rubber material. In some embodiments, main blocks 101 comprise an injection molded recycled rubber material. In some embodiments, main blocks 101 comprise a compression molded recycled rubber material. In some embodiments, main blocks 101 comprise an injection molded recycled rubber and recycled plastic material. In some embodiments, main blocks 101 comprise a compression molded recycled rubber and recycled plastic material. In some embodiments, main blocks 101 comprise a polymer. In some embodiments, main blocks 101 comprise a recycled polymer. In some embodiments, main blocks 101 comprise a mesh rubber or a mesh recycled rubber. In some embodiments, main blocks 101 comprise a crumb rubber. In some embodiments, main blocks 101 comprise a mesh rubber or a mesh recycled rubber having a particle size in a range of 20 mesh to 100 mesh. In some embodiments, main blocks 101 comprise a mesh rubber or a mesh recycled rubber having a particle size of 30 mesh to 90 mesh. In some embodiments, main blocks 101 comprise a mesh rubber or a mesh recycled rubber having some other suitable particle size. In some embodiments, main blocks 101 comprise a thermoplastic olefin (TPO), an olefinic thermoplastic elastomer, a thermoplastic vulcanizate (TPV), Polymethylpentene (PMP or TPX©), a polymer/filler blend comprising one or more of a thermoplastic, a thermoplastic polymer, a thermoplastic rubber (TPR), an elastomer or rubber, polypropylene, olefin, or some other suitable material. In some embodiments, one or more of the main blocks 101 comprises a metal material. In some embodiments main, blocks 101 comprise one or more of an extruded rubber, recycled rubber, mesh rubber, mesh recycled rubber, a crumb rubber, polymer, recycled polymer, plastic, recycled plastic, thermoplastic olefin, elastomer, a thermoplastic olefin (TPO), an olefinic thermoplastic elastomer, a thermoplastic vulcanizate (TPV), Polymethylpentene (PMP or TPX©), a polymer/filler blend comprising one or more of a thermoplastic, a thermoplastic polymer, a thermoplastic rubber (TPR), an elastomer or rubber, polypropylene, olefin, some other suitable material, or a combination thereof. In some embodiments, main blocks 101 comprise one or more of the aforementioned materials, a binder, a polyurethane, a masticated rubber, a combination of a virgin material and a recycled material, some other suitable material or combination of materials. In some embodiments, main blocks 101 are integrally formed monolithic structures. In some embodiments, main blocks 101 have two or more portions that are separately formed and joined with one another by a weld, a rivet, an adhesive, a coupling, or some other suitable joint or other suitable fastener.

In some embodiments, ramp blocks 103 comprise a same material as the main blocks 101. In some embodiments, ramp blocks 103 comprise a different material compared to main blocks 101. In some embodiments, ramp blocks 103 comprise a metal material. In some embodiments, each of the main blocks 101 and the ramp blocks 103 comprises a polymer. In some embodiments, the mains blocks 101 comprise a first polymer and the ramp blocks 103 comprise a second polymer different from the first polymer. In some embodiments, one or more of the ramp blocks 103 comprises a material other than a recycled rubber material included in the main blocks 101.

In some embodiments, one or more of the main blocks 101 or the ramp blocks 103 are capable of being printed upon, stamped, etched, dyed, hot stamped, pad printed, infused or otherwise marked with a color, text, a logo, image, or other suitable content. In some embodiments, one or more of main blocks 101 or the ramp blocks 103 is printed upon, or colored by, an ink or a dye such that at least a portion of the main block 101 or the ramp block 103 is one or more of white, yellow, red, green, blue, some other suitable color, or a customized color. In some embodiments, one or more of main blocks 101 or the ramp blocks 103 has at least a portion that is printed-upon or colored white, yellow, red, green, blue, some other suitable color, or a customized color by way of at least one of an ink-jet printing process, a gel ink printing process, a laser-printing process, a combination of inks or dyes by way of a multi-color ink printing process, an offset printing process, a 3-D printing process, hot stamp printing, pad printing process, laser marking, laser printing, or other suitable manner by which a color, text, a logo, image, or other suitable content is capable of being printed upon, stamped, etched, dyed, infused or otherwise marked on a substrate. In some embodiments, one or more main blocks 101 or the ramp blocks 103 are colored or dyed to be black, purple, blue, red, magenta, cyan, orange, yellow, or some other suitable color and one or more portions of the main blocks 101 or the ramp blocks 103 has at least a portion that is a different color than the color of the other portions of the main blocks 101 or the ramp blocks 103.

Couplings 105 extend in a column through main blocks 101 and/or ramp blocks 103 that are arranged or aligned in a single column. In some embodiments, couplings 105 comprise a wire, cable, screw, rope, shaft, bar or other suitable fastener that extends all the way through the main blocks 101 and/or ramp blocks 103 that are arranged or aligned in a single column. In some embodiments, a coupling 105 in a single column direction joining main blocks 101 and/or ramp blocks 103 that are arranged or aligned in a single column comprises two or more wires, shafts, cables, screws, ropes, bars, other suitable fasteners, or a combination thereof that together extend all the way through the main blocks 101 and/or ramp blocks 103 that are arranged or aligned in the single column. In some embodiments, one or more couplings 105 comprise a metal material, a polymer, some other suitable material, or combination thereof. In some embodiments, one or more of couplings 105 comprise a stainless steel cable and hardened stud with lock nuts that are configured to tie the main blocks 101 in adjacent columns to one another, and/or tie the main blocks 101 to one or more ramp blocks 103.

In some embodiments, one or more of the couplings 105 are removable from the trackout mat 100 so that one or more of the main blocks 101 or the ramp blocks 103 can be removed and/or replaced. For example, if a main block 101 or a ramp block 104 is damaged, marred, lost, missing, worn, or otherwise rendered unrecognizable or unusable, one or more of the couplings 105 is capable of being removed or adjusted to facilitate removal and/or replacement of one or more of the main blocks 101 or the ramp blocks 103.

In some embodiments, the length L and the width W of the trackout mat 100 is customizable at a time of manufacture, assembly or any time thereafter. For example, couplings 105 are capable of being removed and/or added, which makes it possible to remove and/or add one or more columns, rows, or portions of columns or rows of main blocks 101 and/or ramp blocks 103 to modify one or more of the length L, width W, or overall shape of trackout mat 100. In some embodiments, the length L of the trackout mat 100 is greater than the width W of the trackout mat 100. In some embodiments, the length L of the trackout mat 100 is less than the width W of the trackout mat 100. In some embodiments, the length L of the trackout mat 100 is equal to the width W of the trackout mat 100. In some embodiments, the trackout mat 100 is rectangular. In some embodiments, the trackout mat 100 is square. In some embodiments, the trackout mat 100 is L-shaped, cross-shaped, a parallelogram, substantially arc-shaped, or some other suitable shape capable of being made based on the combination, quantities, and arrangements of main blocks 101 and optional ramp blocks 103. In some embodiments, two or more trackout mats 100 are combinable into a single trackout mat 100 by removing one or more of the couplings 105, overlapping some of the main blocks 101 in each trackout mat 100 and fastening the main blocks 101 together using a coupling 105 to form a single trackout mat 100. In some embodiments, one or more of the length L, width W or the overall shape is capable of being set to any quantity or shape at a time of manufacture, assembly, or any time thereafter, by adding, removing and/or replacing one or more main blocks 101 and/or ramp blocks 103 and joining the adjusted quantity, replaced, and/or rearranged one or more main blocks 101 and/or ramp blocks 103 with one or more of the couplings 105. In some embodiments, couplings 105 have an adjustable length, and/or have a capability of being connected with one or more other couplings 105 to extend the length of a coupling in a column direction to facilitate assembly of a longer trackout mat 100.

In some embodiments, all of the main blocks 101 have an identical shape, length, width and height. In some embodiments, one or more of the main blocks 101 optionally varies in at least one of shape, length, width or height from other main blocks 101 included in trackout mat 100. In some embodiments, one or more main blocks 101 comprise multiple transition heights across a length of the main block 101 such that the main block 101 alone, or in combination with one or more other main blocks 101 and/or ramp blocks 103 is configured to one or more of flex, poke, brush, rattle, vibrate or shake tires of a vehicle to loosen mud, or debris from tire, and/or cause the vehicle frame and/or body to vibrate to so that the mud or debris which could be transported out onto a roadway, street or highway, is shaken or knocked off. In some embodiments, one or more of the main blocks 101 has two or more portions that have substantially different heights that are configured to force vehicle tires to bounce as a vehicle travels over the trackout mat 100, creating a vibration that separates the tire treads which releases sediment and debris from the tire.

In some embodiments, one or more of main blocks 101 and ramp blocks 103 comprise a material or blend of materials that is capable of flexing or deforming under a predetermined load at standard temperature and pressure, or some other suitable environment having a temperature lower than room temperature, based on a geometry of the main blocks 101 and/or ramp blocks 103 and a direction of the predetermined load with respect to a main block or ramp block such that the main blocks 101 and/or ramp blocks 103 are resistant to fracture when exposed to a load greater than or equal to the predetermined load at standard temperature and pressure or the other suitable environment. In some embodiments, resistance to fracture under certain predetermined loads in preset environmental conditions helps to extend a service life of the main blocks 101 and/or ramp blocks 103. In some embodiments, one or more of the main blocks 101 or the ramp blocks 103 comprise a material or blend of materials that is capable of flexing or deforming under a predetermined load, and returning back to its original form (i.e., elastic deformation) when subjected to a load caused by a vehicle traveling over the trackout mat 100, wherein the material and/or blend of materials and a quantity of each material in the blend of materials is selected based on an anticipated environment and temperature range of use of the trackout mat 100 to facilitate the elastic deformation capabilities of the main blocks 101 and/or ramp blocks 103. In some embodiments, some main blocks 101 comprise a material or combination of materials that is different from other main blocks 101. For example, in some embodiments, some main blocks 101 are more flexible than other main blocks 101 in the trackout mat 100 such that some main blocks 101 flex more than other main blocks 101, if the other main blocks 101 even flex at all, under a predetermined load at a preset temperature, jostling the vehicle as the vehicle travels over the trackout mat 100 to cause sediment and debris to be released from the tire and/or vehicle frame or body.

In some embodiments, main blocks 101 are arranged such that a spacing of the main blocks 101 exists between main blocks 101 in a same column and between main blocks 101 that are in a same row. The spacing between main blocks 101 forms a plurality of gaps or openings within the trackout mat 100 into which debris that falls from a vehicle may be collected. In some embodiments, a surface over which the trackout mat 100 is place in use is exposed in the openings between main blocks 101. For example, if trackout mat 100 is deployed directly over a gravel driveway, or simply over the ground, debris that falls from a vehicle as the vehicle travels over the trackout mat 100 falls onto the exposed gravel driveway or ground that is exposed through the openings, which helps to reduce maintenance and cleaning time when using, moving, and/or preparing the trackout mat 100 for storage or deployment.

In some embodiments, main blocks 101 have through-holes configured to accommodate one or more couplings 105. To facilitate the coupling of main blocks 101 is a same $i^{th}$ column with one another, the main blocks 101 included in the $i^{th}$ column are aligned such a that first through-holes on a first end of each main block 101 in the $i^{th}$ column and second through-holes on a second end of each main block 101 in the $i^{th}$ column are axially aligned in an $i^{th}$ column direction. To facilitate the coupling of main blocks 101 is a same $i+1^{th}$ column with one another, the main blocks 101 included in the $i+1^{th}$ column are aligned such that the first through-holes and the second through-holes of each block in the $i+1^{th}$ column are axially aligned in an $i+1^{th}$ column direction. To facilitate the coupling of main blocks 101 in the $i^{th}$ column with main blocks 101 in an adjacent $i+1^{th}$ column, for example, the main blocks 101 included in the $i^{th}$ column and the main blocks 101 included in the $i+1^{th}$ column are alternately arranged such that the second through-holes of the main blocks 101 included in the $i^{th}$ column are axially aligned with the first through-holes of the main blocks 101 included in the $i+1^{th}$ column. Main blocks 101 included in adjacent columns i+2, i+3 . . . i+n are similarly aligned as the columns of main blocks 101 increases from the $i^{th}$ to the $i+n^{th}$ column. The couplings 105 extend through the axially aligned first through-holes and second through-holes of the main blocks 101 included in the same the $i^{th}$ to the $i+n^{th}$ column. In some embodiments, the arrangement of main blocks 101 that aligns through holes of main blocks 101 in adjacent columns results in there being a plurality of openings or gaps between main blocks 101 that are in a same column or row.

Figure 2:
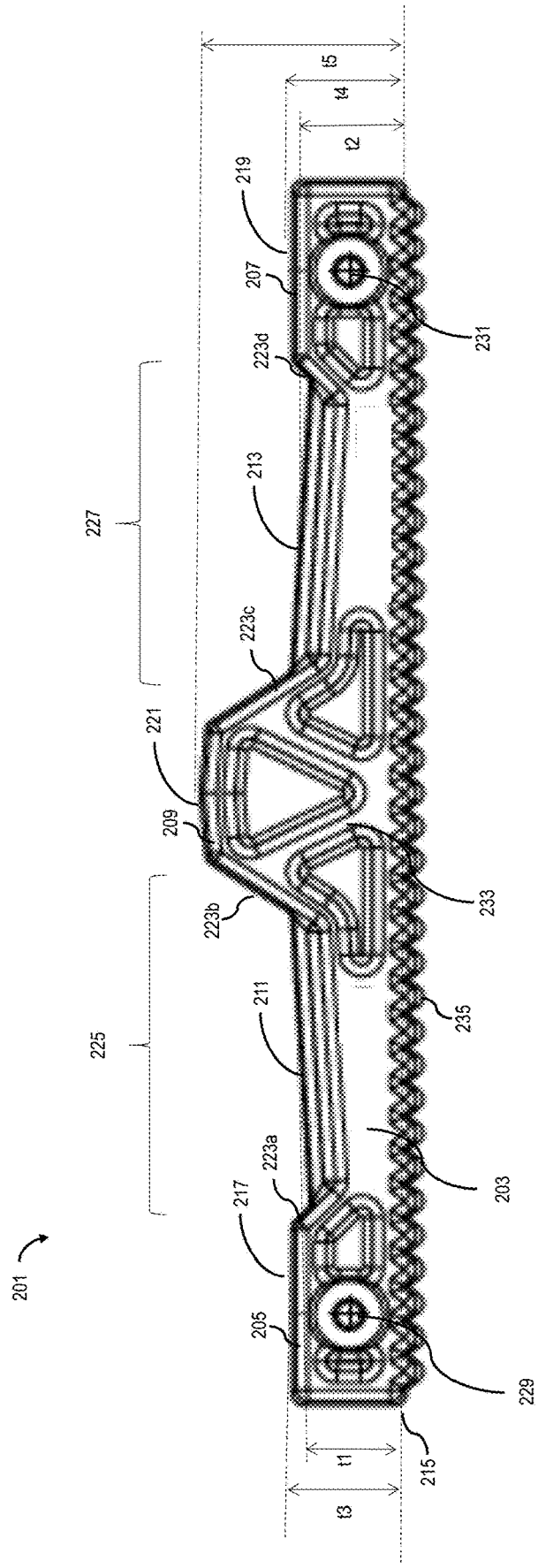
FIG. 2 is a front-side view of a main block for a trackout mat, in accordance with one or more embodiments.
Figure 3:
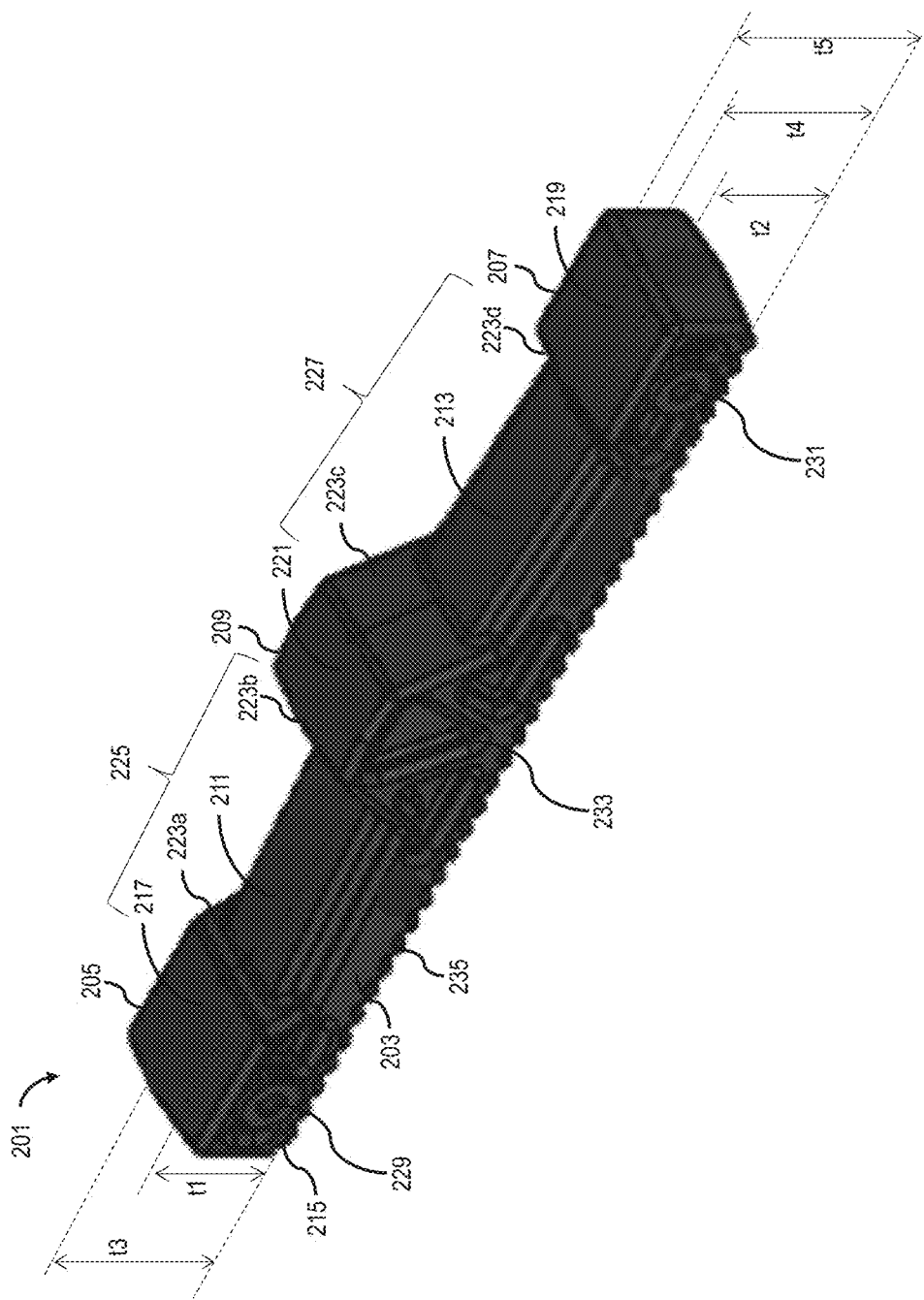
FIG. 3 is a top-side perspective view of a main block for a trackout mat, in accordance with one or more embodiments.

FIG. 2 is a front-side view of a main block 201, in accordance with one or more embodiments. FIG. 3 is a perspective view of a main block 201, in accordance with one or more embodiments. In some embodiments, main block 201 is usable as main block 101 (FIG. 1).

Main block 201 comprises a first block portion 203, a second block portion 205, a third block portion 207 and a fourth block portion 209. First block portion 203 has a first upper surface 211, a second upper surface 213, and a lower surface 215 opposite the first upper surface 211 and the second upper surface 213. Second block portion 205 is over the first block portion 203. The second block portion 205 has a third upper surface 217 opposite the lower surface 215. Third block portion 207 is over the first block portion 203. Third block portion 207 has a fourth upper surface 219 opposite the lower surface 215. Fourth block portion 209 is over the first block portion 203. Fourth block portion 209 has a fifth upper surface 221 opposite the lower surface 215. Fourth block portion 209 is positioned between the second block portion 205 and the third block portion 207. In some embodiments, one or more of the first upper surface 211, the second upper surface 213, the lower surface 215, the third upper surface 217, the fourth upper surface 219 or the fifth upper surface 221 is a planar surface. In some embodiments, one or more of the first upper surface 211, the second upper surface 213, the lower surface 215, the third upper surface 217, the fourth upper surface 219 or the fifth upper surface 221 is a curved surface. In some embodiments, one or more of the first upper surface 211, the second upper surface 213, the lower surface 215, the third upper surface 217, the fourth upper surface 219 or the fifth upper surface 221 is plateau-shaped, has bristles, has a plurality of projections or nubs extending away from an interior of the main block 101, or has some other suitable shape.

The second block portion 205, third block portion 207 and fourth block portion have sidewalls 223a-223f (collectively referred to herein as sidewalls 223). Sidewall 223b extends from the third upper surface 217 to the first upper surface 211, sidewall 223c extends from the fifth upper surface 221 to the first upper surface 211, sidewall 223d extends from the fifth upper surface 221 to the second upper surface 213, and sidewall 223e extends from the fourth upper surface 219 to the second upper surface 213. Sidewalls 223b-223e are slanted with respect to the first upper surface 211 and the second upper surface 213. In some embodiments, at least one of the sidewalls 223b-223e is perpendicular to at least one of the first upper surface 211 or the second upper surface 213. In some embodiments, all of the sidewalls 223b-223e are perpendicular to at least one of the first upper surface 211 or the second upper surface 213.

A first recessed region 225 is between the second block portion 205 and the fourth block portion 209. A second recessed region 227 is between the third block portion 207 and the fourth block portion 209. The first upper surface 211 is exposed in the first recessed region 225 and the second upper surface 213 is exposed in the second recessed region 225. At least one of the first recessed region 225 or the second recessed region 227 is formed between a pair of slanted sidewalls 223 that are slanted with respect to at least one of the first upper surface 211 or the second upper surface 213. In some embodiments, at least one of the first recessed region 225 or the second recessed region is formed between a pair of perpendicular sidewalls 223 that are perpendicular to at least one of the first upper surface 211 or the second upper surface 213. In some embodiments, one or more of the sidewalls 223 is perpendicular to at least one of the first upper surface 211 or the second upper surface 213 and one or more of the sidewalls 223 is slanted with respect to at least one of the first upper surface 211 or the second upper surface 213. In some embodiments, one or more of the sidewalls 223 is perpendicular to the lower surface 215 and one or more of the sidewalls 223 is slanted with respect to lower surface 215.

First block portion 203 has a first thickness t1 between the first upper surface 211 in the first recessed region 225 and the lower surface 215. First block portion 203 has a second thickness t2 between the second upper surface 213 in the second recessed region 227 and the lower surface 215. A third thickness t3 between the third upper surface 217 and the lower surface 215 is greater than the first thickness t1. In some embodiments, third thickness t3 is equal to first thickness t1. A fourth thickness t4 between the fourth upper surface 219 and the lower surface 215 is greater than the second thickness t2. In some embodiments, fourth thickness t4 is equal to second thickness t2. A fifth thickness t5 between the fifth upper surface 221 and the lower surface 215 is greater than the first thickness t1 and greater than the second thickness t2. In some embodiments, fifth thickness t5 is greater than at least one of the first thickness t1 or the second thickness t2. In some embodiments, the first thickness t1 is equal to the second thickness t2. In some embodiments, the first thickness t1 is different from the second thickness t2. In some embodiments, at least one of the first thickness t1 or the second thickness t2 is uniform across a width w1 of the first recessed region or a width w2 the second recessed region. In some embodiments, at least one of the first upper surface 211 is askew with respect to the lower surface 215 or the second upper surface 213 is askew with respect to the lower surface 215. In some embodiments, at least one of the third thickness t3 or the fourth thickness t4 is greater than the first thickness t1 and the second thickness t2, and the fifth thickness t5 is greater than the third thickness t3 and the fourth thickness t4. In some embodiments, the fifth thickness t5 is greater than at least one of the third thickness t3 or the fourth thickness t4. In some embodiments, fifth thickness t5 is greater than the first thickness t1 and at least one of the third thickness t3 or the fourth thickness t4. In some embodiments, the third thickness t3 is equal to the fourth thickness t4.

In some embodiments, first thickness t1 is an average thickness of the first block portion 203 across a length of the first upper surface 211. In some embodiments, the third thickness t3 is equal to the average thickness of the first block portion 203 across the length of the first upper surface 211. In some embodiments, the third thickness t3 is greater than the average thickness the first block portion 203 across the length of the first upper surface 211. In some embodiments, the third thickness t3 less than the average thickness of the first block portion 203 across the length of the first upper surface 211. In some embodiments, the third thickness t3 is equal to a minimum thickness of the first block portion 203 across the length of the first upper surface 211. In some embodiments, the third thickness t3 is greater than the minimum thickness of t the first block portion 203 across the length of the first upper surface 211. In some embodiments, the third thickness t3 less than the minimum thickness of the first block portion 203 across the length of the first upper surface 211. In some embodiments, the third thickness t3 is equal to a maximum thickness of the first block portion 203 across the length of the first upper surface 211. In some embodiments, the third thickness t3 is greater than the maximum thickness of the first block portion 203. In some embodiments, the third thickness t3 less than the maximum thickness of the first block portion 203 across the length of the first upper surface 211.

In some embodiments, second thickness t2 is an average thickness of the first block portion 203 across a length of the second upper surface 213. In some embodiments, the fourth thickness t4 is equal to the average thickness of the first block portion 203 across the length of the second upper surface 213. In some embodiments, the fourth thickness t4 is greater than the average thickness of the first block portion 203. In some embodiments, the fourth thickness t4 less than the average thickness of the first block portion 203 across the length of the second upper surface 213. In some embodiments, the fourth thickness t4 is equal to a minimum thickness of the first block portion 203 across the length of the second upper surface 213. In some embodiments, the fourth thickness t4 is greater than the minimum thickness of the first block portion 203 across the length of the second upper surface 213. In some embodiments, the fourth thickness t4 less than the minimum thickness of the first block portion 203 across the length of the second upper surface 213. In some embodiments, the fourth thickness t4 is equal to a maximum thickness of the first block portion 203 across the length of the second upper surface 213. In some embodiments, the fourth thickness t4 is greater than the maximum thickness of the first block portion 203 across the length of the second upper surface 213. In some embodiments, the fourth thickness t4 less than the maximum thickness of the first block portion 203 across the length of the second upper surface 213.

In some embodiments, the fifth thickness t5 is greater than at least one of the first thickness t1 or the second thickness t2 by at least 50% to increase an amount that a vehicle tire drops as the vehicle travels over the trackout mat 100. In some embodiments, the fifth thickness t5 is greater than at least one of the first thickness t1 or the second thickness t2 by at least 100% to increase an amount that a vehicle tire drops as the vehicle travels over the trackout mat 100. In some embodiments, the fifth thickness t5 is greater than at least one of the first thickness t1 or the second thickness t2 by at least 150% to increase an amount that a vehicle tire drops as the vehicle travels over the trackout mat 100. In some embodiments, the fifth thickness t5 is greater than at least one of the first thickness t1 or the second thickness t2 by at least 200% to increase an amount that a vehicle tire drops as the vehicle travels over the trackout mat 100. In some embodiments, the fifth thickness t5 is greater than at least one of the first thickness t1 or the second thickness t2 by more than 300% to increase an amount that a vehicle tire drops as the vehicle travels over the trackout mat 100.

In some embodiments, the first block portion 203, the second block portion 205, the third block portion 207, and the fourth block portion 209 comprise a same material. In some embodiments, the first block portion 203, the second block portion 205, the third block portion 207, and the fourth block portion 209 together form a monolithic structure. In some embodiments, the first block portion 203, the second block portion 205, the third block portion 207, and the fourth block portion 209 comprise a same continuous material. In some embodiments, the first block portion 203 comprises a first material, and at least one of the second block portion 205, the third block portion 207, or the fourth block portion 209 comprises a second material different from the first material.

A first through-hole 229 extends through at least one of the first block portion 203 or the second block portion 205 in a direction transverse to a length direction of the first block portion 203. A second through-hole 231 extends through at least one of first block portion 203 or the third block portion 207 in the direction transverse to the length direction of the first block portion 203. A trackout mat that includes multiple main blocks 201 has one or more couplings 105 (FIG. 1). Main block 201 is configured to accommodate one or more couplings 105 so that the one or more couplings 105 extend through the first through hole 229 or the second through hole 231 that are axially aligned in a column direction.

Main block 201 comprises support structures 233 on a front side and a rear side of the main block 201. In some embodiments, support structures 233 are trusses that are formed by depressions into a side surface of the main block 201 such that the support structures 233 are integrally formed with the first block portion 203, the second block portion 205, the third block portion 207 and the fourth block portion 209. In some embodiments, support structures 233 are separately formed from one or more of the first block portion 203, the second block portion 205, the third block portion 207 or the fourth block portion 209 and joined with one or more of the first block portion 203, the second block portion 205, the third block portion 207 or the fourth block portion 209 by a weld, an adhesive, a coupling, or some other suitable joint. In some embodiments, support structures 233 comprise a metal material. In some embodiments, the support structures 233 comprises a same material as at least one of the first block portion 203, the second block portion 205, the third block portion 207 or the fourth block portion 209. In some embodiments, one or more of the first block portion 203, the second block portion 205, the third block portion 207 or the fourth block portion 209 comprise a first material and the support structures 233 comprise a second material different from the first material. In some embodiments, one or more of the support structures 233 comprises a material other than a recycled rubber material included in the first block portion 203, the second block portion 205, the third block portion 207 and/or the fourth block portion 209. In some embodiments, main block 201 is free from having support structure 233.

Main block 201 has treads 235 along a bottom side of the first block portion 203 opposite the first upper surface 211 and the second upper surface 213. In some embodiments, main block 201 is free from having treads 235. In some embodiments, treads 235 are integrally formed with the first block portion 203. In some embodiments, treads 235 are separately formed from the first block portion 203 and joined with the first block portion 203 by a weld, an adhesive, a coupling, a fastener, or some other suitable joint. In some embodiments, treads 235 comprise a metal material. In some embodiments, treads 235 comprise a same material as the first block portion 203, the second block portion 205, the third block portion 207 and the fourth block portion 209. In some embodiments, one or more of the first block portion 203, the second block portion 205, the third block portion 207 or the fourth block portion 209 comprise a first material and the treads 235 comprise a second material different from the first material. In some embodiments, one or more of the treads 235 comprises a material other than a recycled rubber material included in the first block portion 203, the second block portion 205, the third block portion 207 and/or the fourth block portion 209.

Figure 4:
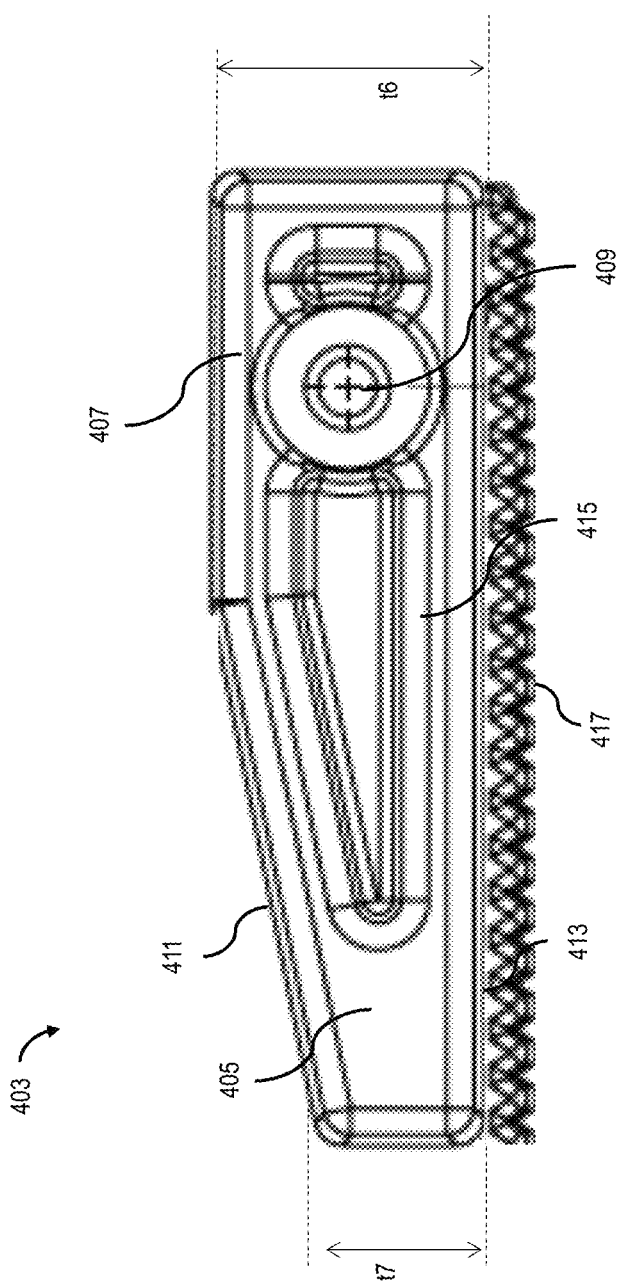
FIG. 4 is a front-side view of a ramp block for a trackout mat, in accordance with one or more embodiments.
Figure 5:
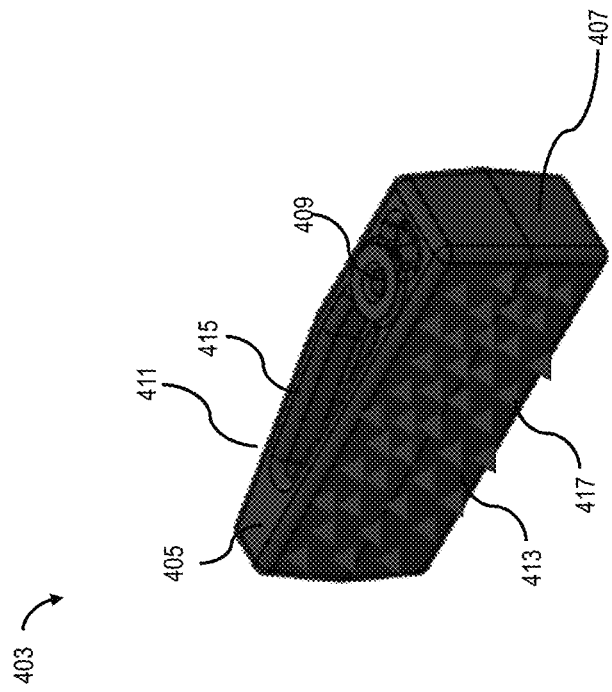
FIG. 5 is a bottom-side perspective view of a ramp block for a trackout mat, in accordance with one or more embodiments.

FIG. 4 is a front-side view of a ramp block 403 for a trackout mat, in accordance with one or more embodiments. FIG. 5 is a bottom-side perspective view of ramp block 403, in accordance with one or more embodiments. Ramp block 403 is usable as ramp block 103 (FIG. 1).

Ramp block 403 comprises a ramp portion 405 and a connection portion 407. Ramp block 403 has a through hole 409 extending through the connection portion 407 in a direction transverse to a length direction of the ramp block 403. A trackout mat that includes multiple main blocks 201 (FIG. 2) has one or more couplings 105 (FIG. 1). Ramp block 403 is configured to accommodate one or more couplings 105 so that the one or more couplings 105 extend through the through holes 409 that are axially aligned in a column direction.

The ramp portion 405 has a tapered thickness from a maximum thickness t6 to a minimum thickness t7 such that a top surface 411 of the ramp portion 405 is slanted with respect to a bottom surface 413 of the ramp block 403. In some embodiments, maximum thickness t6 is equal to one or more of third thickness t3 (FIG. 2) or fifth thickness t5 (FIG. 1), facilitating a smooth transition from the ramp block to an adjoining main block in trackout mat 100. In some embodiments, maximum thickness t6 is greater than one or more of third thickness t3 or fifth thickness t5, to induce an extra vibration as a vehicle travelling across the trackout mat 100 transitions from the ramp block to an adjoining main block in trackout mat 100. In some embodiments, maximum thickness t6 is less than one or more of third thickness t3 or fifth thickness t5, to induce an extra vibration as a vehicle travelling across the trackout mat 100 transitions from the ramp block to an adjoining main block in trackout mat 100.

In some embodiments, the ramp portion 405 and the connection portion 407 comprise a same material. In some embodiments, the ramp portion 405 and the connection portion 407 together form a monolithic structure. In some embodiments, the ramp portion 405 and the connection portion 407 comprise a same continuous material. In some embodiments, the ramp portion 405 comprises a first material, and connection portion 407 comprises a second material different from the first material.

Ramp block 403 comprises support structures 415 on a front side and a rear side of the ramp block 403. In some embodiments, support structures 415 are trusses that are formed by depressions into a side surface of the ramp block 403 such that the support structures 415 are integrally formed with the ramp portion 405 and the connection portion 407. In some embodiments, support structures 415 are separately formed from one or more of the ramp portion 405 or the connection portion 407 and joined with one or more of ramp portion 405 or the connection portion 407 by a weld, an adhesive, a coupling, a fastener or some other suitable joint. In some embodiments, support structures 415 comprise a metal material. In some embodiments, the support structures 415 comprises a same material as one or more of the ramp portion 405 or the connection portion 407. In some embodiments, one or more of ramp portion 405 or the connection portion 407 comprise a first material and the support structures 415 comprise a second material different from the first material. In some embodiments, one or more of the support structures 415 comprises a material other than a recycled rubber material included in ramp portion 405 and/or the connection portion 407. In some embodiments, ramp block 403 is free from having support structures 415.

Ramp block 403 has treads 417 along a bottom side of the ramp block 403. In some embodiments, ramp block 403 is free from having treads along the bottom side of the ramp block 403. In some embodiments, treads 417 are identical to treads 235 (FIG. 2) that are on the bottom side of main block 201 (FIG. 2). In some embodiments, treads 417 have a shape or texture that is different from treads 235 of main block 201. In some embodiments, treads 417 are a different size, material or combination of materials compared to treads 235. In some embodiments, treads 417 are integrally formed with the ramp block 403. In some embodiments, treads 417 are separately formed from the ramp block 403 and joined with the ramp block 403 by a weld, an adhesive, a coupling, a fastener, or some other suitable joint. In some embodiments, treads 417 comprise a metal material. In some embodiments, treads 417 comprise a same material as the ramp block 403. In some embodiments, ramp block 403 comprises a first material and the treads 417 comprise a second material different from the first material. In some embodiments, the treads 417 comprise a material other than a recycled rubber material included in the ramp block 403.

Figure 6:
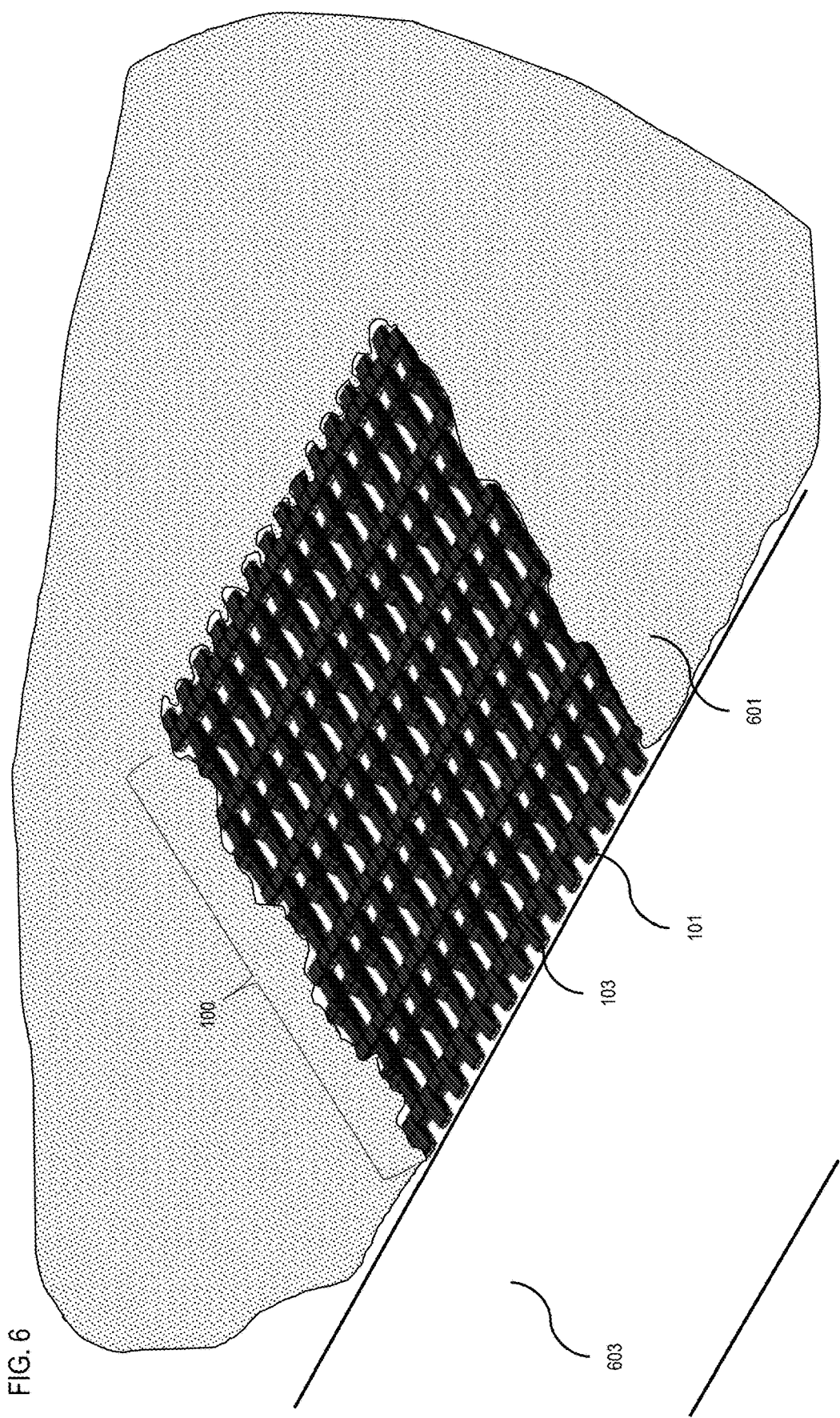
FIG. 6 is a top-side perspective view of a trackout mat in a deployed state, in accordance with one or more embodiments.

FIG. 6 is a top-side perspective view of trackout mat 100 in a deployed state, in accordance with one or more embodiments. Trackout mat 100 is positioned at a construction site 601 along a roadway 603 such that the ramp blocks 103 are along the roadway 603. In use, a vehicle that travels over the trackout mat 100 will be jarred by height variations across a length of the main blocks 101 such that debris that is on the vehicle is caused to shake loose from the vehicle before the vehicle enters the roadway 603.

In some embodiments, the mesh structure that is formed by the plurality of main blocks 101 and optional ramp blocks 103 via couplings 105 (FIG. 1), which makes it possible for the main blocks 101 and/or the ramp blocks 103 to rotate about a coupling 105 that extends through the a main block 101 or ramp block 103 makes it possible for trackout mat 100 to conform to the topography of the surface over which the trackout mat 100 is deployed. For example, if the trackout mat 100 is deployed over undulating ground at construction site 601, trackout mat 100 is configured to flex by way of rotating blocks about couplings 105 to conform to the terrain below. The conformance of the trackout mat 100 to the surface over which the trackout mat is deployed improves the life expectancy of the trackout mat 100 by reducing stress experienced by the trackout mat 100 that, if the trackout mat 100 were incapable of flexing as described, could be caused by gaps between the ground below and the trackout mat 100 as a vehicle travels over trackout mat 100. Additionally, the capability to conform to the terrain below trackout mat 100 improves the stability of the trackout mat 100 without requiring additional hardware to anchor the trackout mat 100 by helping to reduce a slippage of the trackout mat 100 by increasing a surface area of the trackout mat 100 that is in contact with the surface over which the trackout mat 100 is deployed. If one or more of the main blocks 101 or the ramp blocks 103 have optional treads 235 (FIG. 2) on a bottom surface thereof, the treads 235 further improve the ability of the trackout mat 100 to grip the terrain below and be firmly planted to the ground without requiring additional hardware to anchor the trackout mat 100, helping to hold the trackout mat 100 in place as vehicles drive over the trackout mat 100.

Figure 7:
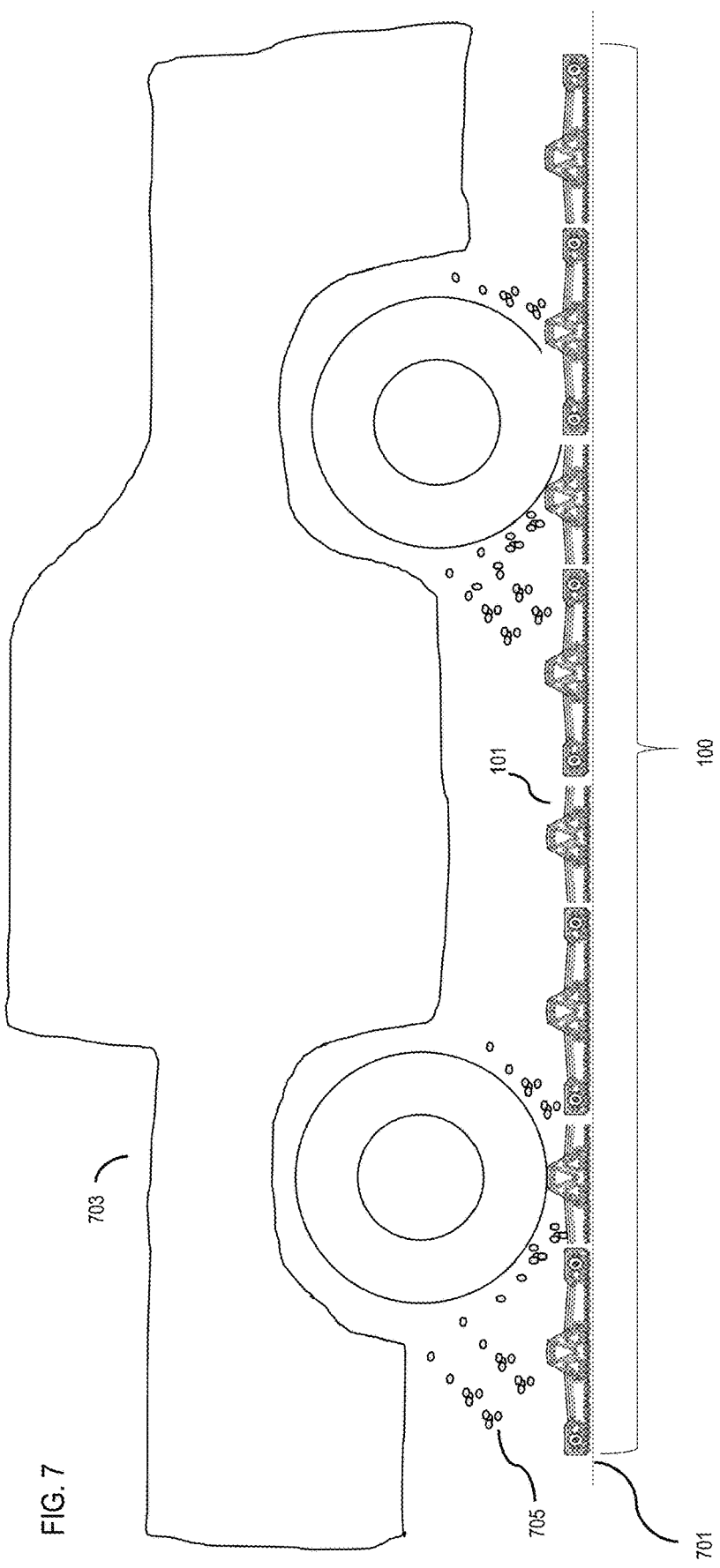
FIG. 7 is a side view of a trackout mat in a deployed state, in accordance with one or more embodiments.

FIG. 7 is a side view of trackout mat 100, in accordance with one or more embodiments. Trackout mat 100 is positioned over a surface 701. In use, as a vehicle 703 travels over the trackout mat 100, the vehicle 703 will be jarred such that debris 705 that is on the vehicle 703 is caused to shake loose from the vehicle 703, helping to reduce an amount of debris 705 that would otherwise be carried from the vehicle 703 onto a roadway, improving safety on the roadway and potentially avoiding fines that may be imposed by a municipality for tracking debris from a construction site onto a nearby roadway.

Figure 8:
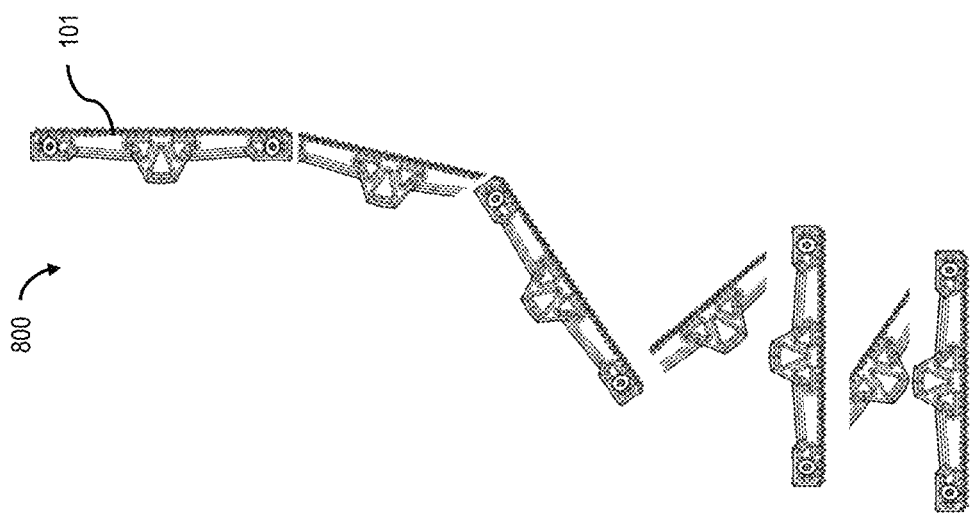
FIG. 8 is a side view of a trackout mat in a partially folded state, in accordance with one or more embodiments.

FIG. 8 is a side view of a trackout mat 100 in a partially folded-state, in accordance with one or more embodiments. Couplings 105 (FIG. 1) are configured to facilitate a folding or rolling of the trackout mat 100 for storage or transport. Similarly, couplings 105 are configured to facilitate an unfolding or unrolling of the trackout mat 100 for deployment. In some embodiments, couplings 105 comprise wires, shafts, bars, cables, screws, ropes or other suitable fasteners that link the plurality of main blocks 101, and optionally included ramp blocks 103 (FIG. 1), so that the main blocks 101 and/or ramp blocks 103 rotate around the couplings 105 as the trackout mat 100 is folded or rolled up. In some embodiments, the linking of the main blocks 101 by way of the couplings 105 results in there being a mesh-like pattern, wherein some of the main blocks 101 fold into a gap between two other main blocks 101 that are in an adjacent column of the trackout mat 100.

Figure 9:
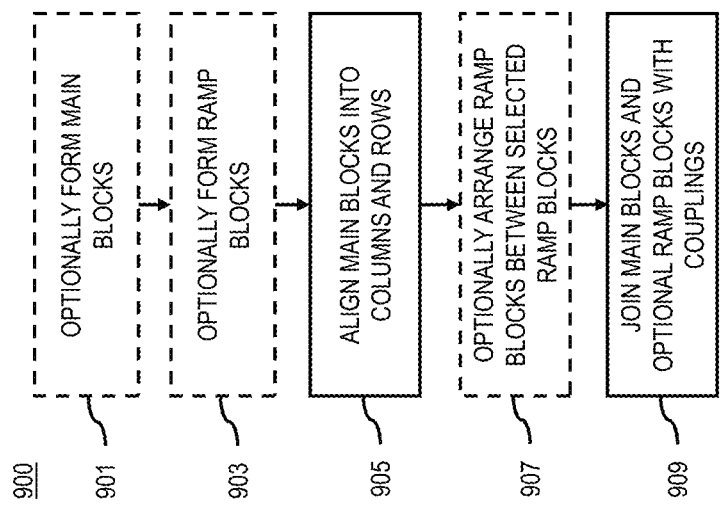
FIG. 9 is a flowchart of a method of forming a trackout mat, in accordance with one or more embodiments.

In some embodiments, trackout mat 100 is configured to be one or more of picked up, rolled up, folded or hung and shaken to clean the trackout mat 100 from debris that has accumulated in the openings between main blocks 101. In some embodiments, trackout mat 100 has one or more portions, hooks, spacing between main blocks 101, wires or other suitable coupling configured to be engaged by a front loader, fork lift, crane, other suitable piece of machinery to maneuver the trackout mat 100 so as to one or more pick up, roll up, fold, hang, shake or transport the trackout mat 100. In some embodiments, the FIG. 9 is a flowchart of a method 900 of forming a trackout mat, in accordance with one or more embodiments.

In optional step 901, a plurality of main blocks such as main blocks 101 (FIG. 1) are formed by way of an injection molding process, a compression molding process, a 3D printing process, an extrusion molding process, or some other suitable process.

In optional step 903, a plurality of ramp blocks such as ramp blocks 103 (FIG. 1) are formed by way of an injection molding process, a compression molding process, a 3D printing process, an extrusion molding process, or some other suitable process.

In step 905, the plurality of main blocks are aligned in columns and rows.

In optional step 907, some of the ramp blocks of the plurality of ramp blocks are arranged in a first column between two of the main blocks, and some of the ramp blocks of the plurality of ramp blocks are arranged in a second column between two of the main blocks such that through holes of the ramp blocks are aligned with through holes of the main blocks.

In step 909, couplings such as couplings 105 (FIG. 1) are used to join the plurality of main blocks and the optionally included plurality of ramp blocks into a mesh of blocks, forming the trackout mat.

An aspect of this description relates to a block for a trackout mat, the comprising a first block portion, a second block portion, a third block portion and a fourth block portion. The first block portion has a first upper surface, a second upper surface, and a lower surface opposite the first upper surface and the second upper surface. The second block portion is over the first block portion. The second block portion has a third upper surface opposite the lower surface. The third block portion is over the first block portion. The third block portion has a fourth upper surface opposite the lower surface. The fourth block portion is over the first block portion. The fourth block portion has a fifth upper surface opposite the lower surface. The fourth block portion is positioned between the second block portion and the third block portion. A first recessed region is between the second block portion and the fourth block portion. A second recessed region is between the third block portion and the fourth block portion. The first upper surface is exposed in the first recessed region and the second upper surface is exposed in the second recessed region.

Another aspect of this description is related to an apparatus, comprising a plurality of blocks arranged in columns and rows. Each block of the plurality of blocks comprises a first block portion, a second block portion, a third block portion and a fourth block portion. The first block portion has a first upper surface, a second upper surface, and a lower surface opposite the first upper surface and the second upper surface. The second block portion is over the first block portion. The second block portion has a third upper surface opposite the lower surface. The third block portion is over the first block portion. The third block portion has a fourth upper surface opposite the lower surface. The fourth block portion is over the first block portion. The fourth block portion has a fifth upper surface opposite the lower surface. The fourth block portion is positioned between the second block portion and the third block portion. A first recessed region is between the second block portion and the fourth block portion. A second recessed region is between the third block portion and the fourth block portion. The first upper surface is exposed in the first recessed region and the second upper surface is exposed in the second recessed region. A first through-hole extends through at least one of the first block portion or the second block portion in a direction transverse to a length direction of the first block portion. A second through-hole extends through at least one of first block portion or the third block portion in the direction transverse to the length direction of the first block portion. The blocks of the plurality of blocks included in an $i^{th}$ column are aligned such that the first through-holes and the second through-holes of each block in the $i^{th}$ column are aligned in an $i^{th}$ column direction. The blocks of the plurality of blocks included in an $i+1^{th}$ column are aligned such that the first through-holes and the second through-holes of each block in the $i+1^{th}$ column are aligned in an $i+1^{th}$ column direction. The blocks of the plurality of blocks included in the $i^{th}$ column and the blocks of the plurality of blocks included in the $i+1^{th}$ column are alternately arranged such that the second through-holes of the blocks of the plurality of blocks included in the $i^{th}$ column are axially aligned with the first through-holes of the blocks of the plurality of blocks included in the $i+1^{th}$ column. The apparatus also comprises a plurality of couplings, wherein each coupling of the plurality of couplings extends through the axially aligned first through-holes and second through-holes of the blocks of the plurality of blocks included in the $i^{th}$ column and the blocks of the plurality of blocks included in the $i+1^{th}$ column.

A further aspect of this description is related to a method, comprising forming a plurality of blocks. Each block of the plurality of blocks comprises a first block portion, a second block portion and a third block portion. The first block portion has a first upper surface, a second upper surface, and a lower surface opposite the first upper surface and the second upper surface. The second block portion is over the first block portion. The second block portion has a third upper surface opposite the lower surface. The third block portion is over the first block portion. The third block portion has a fourth upper surface opposite the lower surface. The fourth block portion is over the first block portion. The fourth block portion has a fifth upper surface opposite the lower surface. The fourth block portion is positioned between the second block portion and the third block portion. A first recessed region is between the second block portion and the fourth block portion. A second recessed region between the third block portion and the fourth block portion. The first upper surface is exposed in the first recessed region and the second upper surface is exposed in the second recessed region. A first through-hole extends through at least one of the first block portion or the second block portion in a direction transverse to a length direction of the first block portion. A second through-hole extends through at least one of first block portion or the third block portion in the direction transverse to the length direction of the first block portion. The method also comprises arranging the blocks of the plurality of blocks in columns and rows such that (1) the blocks of the plurality of blocks included in an $i^{th}$ column are aligned with the first through-holes and the second through-holes of each block in the $i^{th}$ column being aligned in an $i^{th}$ column direction, (2) the blocks of the plurality of blocks included in an $i+1^{th}$ column are aligned with the first through-holes and the second through-holes of each block in the $i+1^{th}$ column being aligned in an $i+1^{th}$ column direction, and (3) the blocks of the plurality of blocks included in the $i^{th}$ column and the blocks of the plurality of blocks included in the $i+1^{th}$ column are alternately arranged with the second through-holes of the blocks of the plurality of blocks included in the $i^{th}$ column being axially aligned with the first through-holes of the blocks of the plurality of blocks included in the $i+1^{th}$ column. The method further comprises coupling the blocks in adjacent columns, forming a mesh of blocks, using couplings that extend through the axially aligned first through-holes and second through-holes of the blocks of the plurality of blocks included in the adjacent columns.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A block for a trackout mat, the block comprising:
a first block portion having a first upper surface, a second upper surface, and a lower surface opposite the first upper surface and the second upper surface;
a second block portion over the first block portion, the second block portion having a third upper surface opposite the lower surface;
a third block portion over the first block portion, the third block portion having a fourth upper surface opposite the lower surface;
a fourth block portion over the first block portion, the fourth block portion having a fifth upper surface opposite the lower surface, the fourth block portion being positioned between the second block portion and the third block portion;
a first recessed region between the second block portion and the fourth block portion; and
a second recessed region between the third block portion and the fourth block portion,
wherein
at least one of the first upper surface is askew with respect to the lower surface or the second upper surface is askew with respect to the lower surface, and
the first upper surface is exposed in the first recessed region and the second upper surface is exposed in the second recessed region.

2. The block of claim 1, wherein
the first block portion has a first thickness between the first upper surface in the first recessed region and the lower surface,
the first block portion has a second thickness between the second upper surface in the second recessed region and the lower surface,
a third thickness between the third upper surface and the lower surface is greater than or equal to the first thickness,
a fourth thickness between the fourth upper surface and the lower surface is greater than or equal to the second thickness, and
a fifth thickness between the fifth upper surface and the lower surface is greater than at least one of the first thickness, the second thickness, or the third thickness.

3. The block of claim 2, wherein the first thickness is equal to the second thickness.

4. The block of claim 2, wherein the first thickness is variable across a length of the first upper surface, the second thickness is variable across a length of the second upper surface, an average of the first thickness is equal to the third thickness, and an average of the second thickness is equal to the fourth thickness.

5. The block of claim 2, wherein at least one of the third thickness or the fourth thickness is greater than the first thickness and the second thickness, and the fifth thickness is greater than the third thickness and the fourth thickness.

6. The block of claim 2, wherein the fifth thickness is greater than the first thickness and at least one of the third thickness or the fourth thickness.

7. The block of claim 6, wherein the third thickness is equal to the fourth thickness.

8. The block of claim 1, wherein the first block portion, the second block portion, the third block portion, and the fourth block portion comprise a polymer.

9. The block of claim 1, wherein the first block portion, the second block portion, the third block portion, and the fourth block portion together form a monolithic structure.

10. The block of claim 1, wherein the first block portion comprises a first polymer, and at least one of the second block portion, the third block portion, or the fourth block portion comprises a second polymer different from the first polymer.

11. The block of claim 1, wherein at least one of the first recessed region or the second recessed region is formed between a pair of slanted sidewalls.

12. The block of claim 1, wherein
a first through-hole extends through at least one of the first block portion or the second block portion in a direction transverse to a length direction of the first block portion, and
a second through-hole extends through at least one of first block portion or the third block portion in the direction transverse to the length direction of the first block portion.

13. The block of claim 2, wherein
the first thickness is variable across a length of the first upper surface,
the second thickness is variable across a length of the second upper surface,
the third thickness is greater than a minimum of the first thickness between the first upper surface and the lower surface, and
the fourth thickness is greater than a minimum of the second thickness between the second upper surface and the lower surface.

14. An apparatus, comprising:
a plurality of blocks arranged in columns and rows, each block of the plurality of blocks comprising:
  a first block portion having a first upper surface, a second upper surface, and a lower surface opposite the first upper surface and the second upper surface;
  a second block portion over the first block portion, the second block portion having a third upper surface opposite the lower surface;
  a third block portion over the first block portion, the third block portion having a fourth upper surface opposite the lower surface;
  a fourth block portion over the first block portion, the fourth block portion having a fifth upper surface opposite the lower surface, the fourth block portion being positioned between the second block portion and the third block portion;
  a first recessed region between the second block portion and the fourth block portion; and
  a second recessed region between the third block portion and the fourth block portion,
  wherein
    at least one of the first upper surface is askew with respect to the lower surface or the second upper surface is askew with respect to the lower surface,
    the first upper surface is exposed in the first recessed region and the second upper surface is exposed in the second recessed region,
    a first through-hole extends through at least one of the first block portion or the second block portion in a direction transverse to a length direction of the first block portion, and
    a second through-hole extends through at least one of first block portion or the third block portion in the direction transverse to the length direction of the first block portion, and
  wherein
    the blocks of the plurality of blocks included in an $i^{th}$ column are aligned such that the first through-holes and the second through-holes of each block in the $i^{th}$ column are aligned in an $i^{th}$ column direction,
    the blocks of the plurality of blocks included in an $i+1^{th}$ column are aligned such that the first through-holes and the second through-holes of each block in the $i+1^{th}$ column are aligned in an $i+1^{th}$ column direction, and
    the blocks of the plurality of blocks included in the $i^{th}$ column and the blocks of the plurality of blocks included in the $i+1^{th}$ column are alternately arranged such that the second through-holes of the blocks of the plurality of blocks included in the $i^{th}$ column are axially aligned with the first through-holes of the blocks of the plurality of blocks included in the $i+1^{th}$ column; and
a plurality of couplings, each coupling of the plurality of couplings extending through the axially aligned first through-holes and second through-holes of the blocks of the plurality of blocks included in the $i^{th}$ column and the blocks of the plurality of blocks included in the $i+1^{th}$ column.

15. The apparatus of claim 14, wherein the couplings of the plurality of couplings extend axially through the first through holes and the second through holes of the blocks of the plurality of blocks such that the columns of blocks are configured to rotate around a coupling extending through the block, and the columns of blocks are configured to be folded on top of one another with a portion of the blocks of the plurality of blocks being at least partially accommodated between other blocks of the plurality of blocks.

16. The apparatus of claim 14, wherein the blocks of the plurality of blocks are first blocks, and the apparatus further comprises at least one column of second blocks, each second block comprising a ramp portion and a connector portion adjacent to the ramp portion, the connector portion having a third through-hole,
  wherein the third through holes are axially aligned with the first through-holes of the blocks of the plurality of blocks included in the $i^{th}$ column or the second through-holes of the blocks of the plurality of blocks included in an $i+n^{th}$ column.

17. The apparatus of claim 14, wherein the first block portion, the second block portion, the third block portion, and the fourth block portion together form a monolithic structure.

18. The apparatus of claim 17, wherein at least one of the first recessed region or the second recessed region is formed between a pair of slanted sidewalls, and the first upper surface, the second upper surface, the third upper surface, the fourth upper surface, the fifth upper surface and the slanted sidewalls together form a continuous surface.

19. The apparatus of claim 14, wherein one or more of the blocks of the plurality of blocks are more flexible compared to the other blocks of the plurality of blocks under a predetermined load.

20. A method, comprising:
forming a plurality of blocks, each block of the plurality of blocks comprising:
  a first block portion having a first upper surface, a second upper surface, and a lower surface opposite the first upper surface and the second upper surface;
  a second block portion over the first block portion, the second block portion having a third upper surface opposite the lower surface;
  a third block portion over the first block portion, the third block portion having a fourth upper surface opposite the lower surface;
  a fourth block portion over the first block portion, the fourth block portion having a fifth upper surface opposite the lower surface, the fourth block portion being positioned between the second block portion and the third block portion;
  a first recessed region between the second block portion and the fourth block portion; and
  a second recessed region between the third block portion and the fourth block portion,
  wherein
    at least one of the first upper surface is askew with respect to the lower surface or the second upper surface is askew with respect to the lower surface,
    the first upper surface is exposed in the first recessed region and the second upper surface is exposed in the second recessed region,
    a first through-hole extends through at least one of the first block portion or the second block portion in a direction transverse to a length direction of the first block portion, and
    a second through-hole extends through at least one of first block portion or the third block portion in the direction transverse to the length direction of the first block portion;

arranging the blocks of the plurality of blocks in columns and rows such that:
the blocks of the plurality of blocks included in an $i^{th}$ column are aligned with the first through-holes and the second through-holes of each block in the $i^{th}$ column being aligned in an $i^{th}$ column direction;
the blocks of the plurality of blocks included in an $i+1^{th}$ column are aligned with the first through-holes and the second through-holes of each block in the $i+1^{th}$ column being aligned in an $i+1^{th}$ column direction; and
the blocks of the plurality of blocks included in the $i^{th}$ column and the blocks of the plurality of blocks included in the $i+1^{th}$ column are alternately arranged with the second through-holes of the blocks of the plurality of blocks included in the $i^{th}$ column being axially aligned with the first through-holes of the blocks of the plurality of blocks included in the $i+1^{th}$ column; and
coupling the blocks in adjacent columns, forming a mesh of blocks, using couplings that extend through the axially aligned first through-holes and second through-holes of the blocks of the plurality of blocks included in the adjacent columns.

* * * * *